United States Patent
Maschwitz et al.

[11] Patent Number: 6,007,901
[45] Date of Patent: Dec. 28, 1999

[54] HEAT REFLECTING FENESTRATION PRODUCTS WITH COLOR CORRECTIVE AND CORROSION PROTECTIVE LAYERS

[75] Inventors: Peter Maschwitz; Ronald Spraker, both of Martinsville, Va.

[73] Assignee: CPFilms, Inc., Martinsville, Va.

[21] Appl. No.: 08/984,977

[22] Filed: Dec. 4, 1997

[51] Int. Cl.$^6$ .................................................. G02B 5/24

[52] U.S. Cl. ..................... 428/216; 428/336; 428/428; 428/432; 428/698; 428/701; 428/702; 359/580; 359/585; 359/586

[58] Field of Search ...................... 428/216, 336, 428/428, 432, 698, 701, 702; 359/580, 585, 586

[56] References Cited

U.S. PATENT DOCUMENTS

| | | |
|---|---|---|
| 3,682,528 | 8/1972 | Apiel et al. . |
| 3,698,946 | 10/1972 | Kaspaul et al. . |
| 3,758,185 | 9/1973 | Gelber . |
| 3,920,533 | 11/1975 | Pompei . |
| 3,990,784 | 11/1976 | Gelber . |
| 4,017,661 | 4/1977 | Gillery . |
| 4,022,947 | 5/1977 | Grubb et al. . |
| 4,098,956 | 7/1978 | Blickensderfer et al. . |
| 4,166,876 | 9/1979 | Chiba et al. . |
| 4,223,974 | 9/1980 | Masso . |
| 4,226,910 | 10/1980 | Dahlen et al. . |
| 4,413,877 | 11/1983 | Suzuki et al. . |
| 4,462,883 | 7/1984 | Hart . |
| 4,497,700 | 2/1985 | Groth et al. . |
| 4,534,841 | 8/1985 | Hartig et al. . |
| 4,548,691 | 10/1985 | Dietrich et al. . |
| 4,565,719 | 1/1986 | Phillips et al. . |
| 4,622,120 | 11/1986 | Gillery . |
| 4,786,563 | 11/1988 | Gillery et al. . |
| 4,790,922 | 12/1988 | Huffer . |
| 4,834,857 | 5/1989 | Gillery . |
| 4,898,789 | 2/1990 | Finley . |

(List continued on next page.)

FOREIGN PATENT DOCUMENTS 0104870  9/1983  European Pat. Off. .

Primary Examiner—Archene Turner
Attorney, Agent, or Firm—Sheldon & Mak; Denton L. Anderson

[57] ABSTRACT

A heat reflecting fenestration composite is provided which includes in sequence: (a) a substantially transparent substrate; (b) a first outer dielectric layer; (c) an infrared reflecting metal layer; (d) a color correcting metal layer comprising a metal different from the infrared reflecting metal layer; (e) a protective metal layer comprising a metal different from the infrared reflecting metal layer and different from the color correcting layer; and (f) a second outer dielectric layer. The dielectric layers are typically indium oxide, indium zinc oxide, indium tin oxide or mixtures thereof. Preferably, the composite also includes additional layers of infrared reflecting metal layer, color correcting metal, protective metal and dielectric. Also preferably, the composite comprises a top layer of glass or transparent polymeric plastic. The infrared reflecting metal layer is typically silver, gold, copper or alloys thereof. The color correcting metal layer typically has a refractive index in the visible light range between about 0.6 and about 4 and has an extinction coefficient for light in the visible light range between about 1.5 and about 7. Metals such as chromium, cobalt, nickel, zinc, palladium, indium, tin, antimony, platinum, bismuth and alloys thereof can be used in the color correcting metal layer, with indium being preferred. The protective metal layer is made from a metal whose oxide is substantially non-optically absorbing, such as aluminum, titanium, zirconium, niobium, hafnium, tantalum, tungsten and alloys thereof, with titanium being preferred. The color correcting and protective metal layers can also be disposed on both sides of the infrared reflecting metal layer. Such composites provide a heat reflecting fenestration structure having exception degradation resistant properties and visible light transmission reduction properties, without excessive reflectance.

32 Claims, 2 Drawing Sheets

U.S. PATENT DOCUMENTS

| | | |
|---|---|---|
| 4,938,857 | 7/1990 | Gillery . |
| 5,059,295 | 10/1991 | Finley . |
| 5,229,881 | 7/1993 | Day et al. . |
| 5,271,994 | 12/1993 | Termath . |
| 5,279,722 | 1/1994 | Szczyrbowski et al. . |
| 5,306,547 | 4/1994 | Hood et al. . |
| 5,506,037 | 4/1996 | Termath . |
| 5,510,173 | 4/1996 | Pass et al. . |
| 5,532,062 | 7/1996 | Miyazaki et al. . |
| 5,589,280 | 12/1996 | Gibbons et al. . |
| 5,591,529 | 1/1997 | Braatz et al. . |
| 5,595,825 | 1/1997 | Guiselin . |

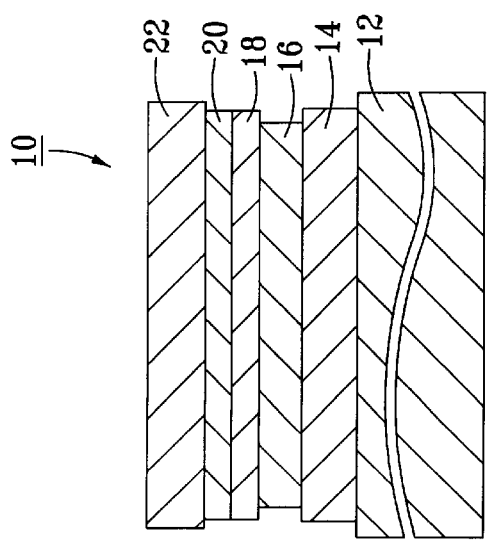
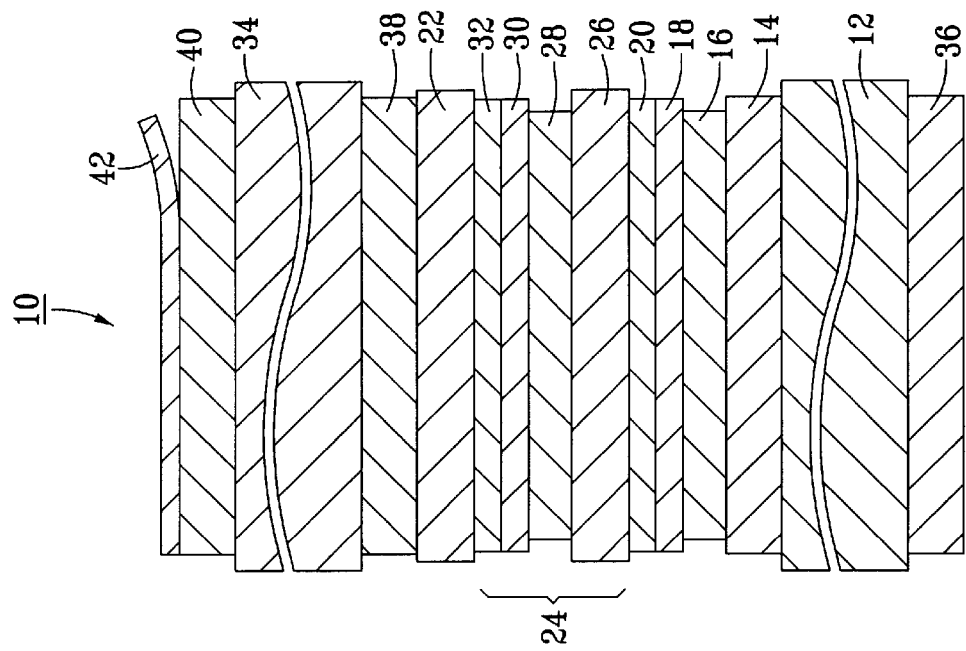

HEAT REFLECTING FENESTRATION PRODUCTS WITH COLOR CORRECTIVE AND CORROSION PROTECTIVE LAYERS

FIELD OF THE INVENTION

This invention relates generally to heat reflecting fenestration composites and, more particularly, to such composites of the dielectric-metal-dielectric type.

BACKGROUND OF THE INVENTION

Heat reflecting fenestration products have become increasingly popular for architectural and vehicular window use. Such products have been found to be highly effective in reducing air conditioning costs and in improving the quality of transmitted visible light.

The most common such fenestration products are composites having multiple thin layers which cooperate with one another to reduce the transmission of infrared and near infrared waves, while allowing the transmittance of a substantial percentage of light in the visible spectrum. A typical composite consists of a transparent substrate such as glass or flexible plastic film. Onto the substrate are deposited multiple stacks of discrete layers, each stack having in sequence a thin film of dielectric material and a heat reflecting metal such as silver, gold or copper.

Each of the layers is generally deposited by thermal evaporation deposition or by "sputtering" deposition, both techniques well-known in the art. For ease and economy of manufacture, each of the layers is typically deposited by sputtering deposition. In sputtering deposition methods, metal molecules from a source metal are induced to "sputter" onto a designated substrate by a strong electrical field under subatmospheric pressures. Where the layer deposited is to be pure metal, such sputtering is accomplished in an inert atmosphere. Where the layer is to be a metal oxide, such sputtering typically is carried out in a highly oxidative atmosphere using, for example, oxygen plasma.

A common problem with the manufacture of such composite structures is the degradation of the infrared reflecting metal layer by its exposure to oxygen plasma during the deposition of dielectric material (generally a metal oxide). Such degradation of the infrared reflecting metal significantly decreases the performance of the composite.

Another problem with such composite structures is the tendency of the infrared reflecting metals to degrade over long periods of time by long-term contact with oxygen or other chemicals from the surrounding atmosphere. This problem is especially acute where the structures are flexible film structures affixed to preexisting architectural or vehicular windows. The application of such films to such preexisting windows is typically carried out using water as described in U.S. Pat. No. 3,891,486, which is incorporated herein by this reference. In the application of such films to such preexisting windows, water used in the application tends to become trapped between the window glass and the flexible film. Over time, this trapped water diffuses through the flexible film to substantially degrade the reflecting metal layers within the composite structure.

Another problem with such composite structures is the general inability of such structures to successfully prevent the transmittance of excessive amounts of visible light. Transmittance of excessive visible light transmits unnecessary quantities of heat and can result in a displeasing "overly-bright" environment for the user.

Still another problem with such composite structures of the prior art is that they often reflect an inordinate percentage of visible light. Such high reflectances give the fenestration product an unpleasant mirror-like appearance. It is generally considered preferable for fenestration products to transmit less than about 15% of light within the visible spectrum.

Still another problem with composite structures of the prior art is that they often do not transmit and/or reflect light on both sides of the fenestration product in "neutral colors." This is especially a problem in products adapted to provide reduced (<60%) visible light transmittance. Although it is considered acceptable for some fenestration products to transmit light which has a slightly blue or slightly green cast, all other "tints" are generally considered undesirable.

Attempts have been made to solve these problems, but such attempts have not been wholly successfully. For example, the disposition of a protective metal layer onto the infrared reflecting metal layer has been found to improve the degradation resistance of the infrared reflecting metal layer during the disposition of the dielectric layers. However, the use of such protective metal layer has not solved—and in many cases made more complicated—the problems of undue light transmittance, undue light reflectance and undesirable tint. Such attempts have also been commonly found to be unduly expensive in manufacture and/or unstable over long periods of time.

Accordingly, there is a need for a heat reflecting fenestration composite which effectively prevents the degradation of the infrared reflecting metal and which reduces the amount of transmitted visible light without causing excessive reflectance, color, distortion or long-term instability.

SUMMARY

The present invention satisfies this need. The invention is a heat reflecting fenestration composite comprising in sequence: (a) a substantially transparent substrate; (b) a first outer dielectric layer; (c) an infrared reflecting metal layer; (d) a color correcting metal layer comprising a metal different from the infrared reflecting metal layer; (e) a protective metal layer comprising a metal different from the infrared reflecting metal layer and different from the color correcting layer; (f) one or more subcomposite layers each comprising: (i) a subcomposite inner dielectric layer; (ii) a subcomposite infrared reflecting metal layer; (iii) a subcomposite color correcting metal layer comprising a metal different from the subcomposite infrared reflecting metal layer; and (iv) a subcomposite protective metal layer comprising a metal different from the subcomposite infrared reflecting metal layer and different from the subcomposite color correcting metal layer; and (g) a second outer dielectric layer.

The dielectric layers are typically indium oxide, indium zinc oxide, indium tin oxide or mixtures thereof. The thickness of the outside dielectric layers is typically between about 0.15 quarter wave optical thickness and about 1 quarter wave optical thickness.

The infrared reflecting metal layers are typically silver, gold, copper or alloys thereof and are laid down in a thickness of between 7 nm and about 25 nm. The color correcting metal layers preferably have a refractive index between about 0.6 and about 4 and an extinction coefficient for light in the visible range between about 1.5 and about 7. The color correcting metal layers most preferably consist essentially of indium.

The protective metal layers are made from a metal whose oxide is substantially-optically non-absorbing, such as aluminum, titanium, zirconium, niobium, hafnium, tantalum, tungsten and alloys thereof. The protective metal layers typically have a thickness between about 1 nm and about 5 nm.

The invention is also a heat reflecting fenestration composite comprising in sequence: (a) a substantially transparent substrate; (b) a first outer dielectric layer; (c) an infrared reflecting metal layer; (d) a color correcting metal layer comprising a metal different from the infrared reflecting metal layer; (e) a protective metal layer comprising a metal different from the infrared reflecting metal layer and different from the color correcting layer; (f) a second outer dielectric layer; and (g) a substantially transparent top layer comprising a substantially transparent glass or polymeric material.

The invention is also a heat reflecting fenestration composite comprising in sequence: (a) a substantially transparent substrate; (b) a first outer dielectric layer chosen from the group of dielectric materials consisting of indium oxide, indium zinc oxide, indium tin oxide and mixtures thereof; (c) an infrared reflecting metal layer comprising an alloy of silver and copper; (d) a color correcting metal layer consisting essentially of indium; (e) a protective metal layer comprising a metal whose oxide has a heat of formation less than (more negative than) −100,000 cal/gm mole at 25° C.; and (f) a second outer dielectric layer chosen from the group of dielectric materials consisting of indium oxide, indium zinc oxide, indium tin oxide and mixtures thereof.

The composite provides a heat reflecting fenestration composite having exceptional degradation resistance. The composite further alloys the manufacturer significantly increased flexibility in the quantity and quality of physical light transmitted through the composite. In all composites of the invention, reflection levels less than about 15% are easily obtained.

DRAWINGS

These features, aspects and advantages of the present invention will become better understood with regard to the following description, appended claims and accompanying figures where:

FIG. 1 is a cross-sectional side view of a heat-reflecting fenestration composite having features of the invention;

FIG. 2 is a cross-sectional side view of a second heat-reflecting fenestration composite having features of the invention;

DESCRIPTION OF THE INVENTION

Figure 4:
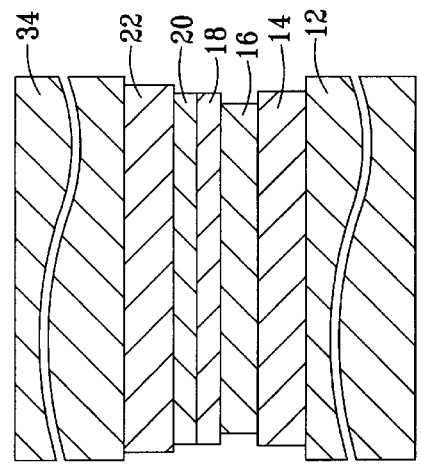
FIG. 4 is a cross-sectional side view of a fourth heat-reflecting fenestration composite having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

As illustrated in FIG. 1, the invention 10 comprises: (a) a substantially transparent substrate 12; (b) a first outer dielectric layer 14; (c) an infrared reflecting metal layer 16; (d) a color correcting metal layer 18 comprising a metal different from the infrared reflecting metal layer 16; (e) a protective metal layer 20 comprising a metal different from the infrared reflecting metal layer 16 and different from the color correcting layer 18; and (f) a second outer dielectric layer 22.

Figure 3:
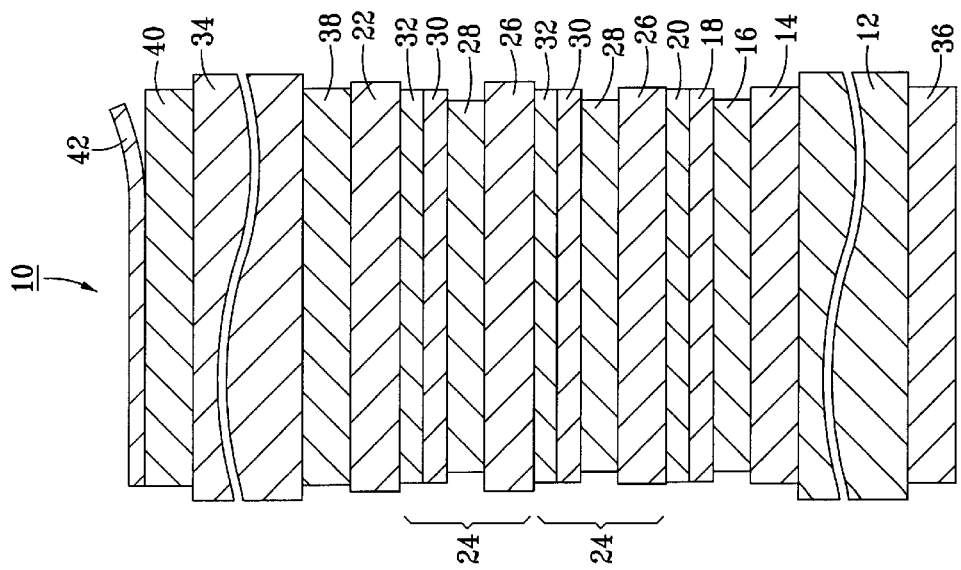
FIG. 3 is a cross-sectional side view of a third heat-reflecting fenestration composite having features of the invention.

As illustrated in FIGS. 2 and 3, the invention 10 can further comprise one or more subcomposites 24 disposed between the protective metal layer 20 and the second outer dielectric layer 22. Each such subcomposite 24 comprises: (a) an inner dielectric layer 26; (b) a subcomposite infrared reflecting metal layer 28; (c) a subcomposite color correcting metal layer 30 comprising a metal different from the subcomposite infrared reflecting metal layer 28; and (d) a subcomposite protective metal layer 32 comprising a metal different from the subcomposite infrared reflecting metal layer 28 and different from the subcomposite color correcting layer 30.

Typically, each layer is disposed immediately contiguous to each referenced adjoining layer. However, intermediate nucleation layers or other intermediate layers can conceivably be interposed between any of the above-referenced layers except between the infrared reflecting metal layer 16 and the color correcting metal layer 18 and between the color correcting metal layer 18 and the protective metal layer 20.

The transparent substrate 12 typically comprises a glass or polymeric plastic material. When the transparent substrate 12 comprises a glass material, the composite 10 is generally a rigid structure. When the transparent substrate 12 is a polymeric plastic, the composite 10 is generally a thin flexible film structure. When the transparent substrate 12 is a polymeric plastic, the transparent substrate 12 is between about 25 and about 300 microns in thickness. Suitable polymeric plastic materials useable in the transparent substrate 12 include a large range of transparent polymeric materials. Polyethylene terephthalate (PE) is a polymeric plastic material suitable for manufacture of the transparent substrate 12.

The dielectric layers 14, 22 and 26 are preferably non-optically absorbing, reflection-reducing dielectric layers. In preferred embodiments, the first and second outer dielectric layers 14 and 22 have a refractive index of between about 1.9 and about 2.5. Inner dielectric layers 26 disposed between the first and second outer dielectric layers 14 and 22 preferably have a refractive index between about 1.4 and about 2.5. Typical materials useable as the dielectric layers 14, 22 and 26 are oxides of magnesium, indium, indium/tin, tin, tantalum, yttrium, niobium, tungsten, zinc, bismuth, titanium or mixtures thereof. Also useable as materials in the dielectric layers 14, 22 and 26 are nitrides of silicon and aluminum. Also suitable as materials in the dielectric layers 26 disposed between the first and second outer dielectric layers 14 and 22 are polymers such as acrylates. Acrylate layers can be conveniently deposited by vacuum deposition techniques such as disclosed in U.S. Pat. No. 4,842,893, which is incorporated herein by this reference.

The most preferred materials useable in the dielectric layers 14, 22 and 26 are indium oxide, indium zinc oxide and indium tin oxide. These materials are preferable because infrared reflecting metal layers 16 in resulting composites 10 have been found to have a high resistance to long-term degradation and because such materials can be deposited at a relatively high rate compared to many other suitable dielectric materials.

Each outer dielectric layer 14 and 22 has a thickness between about 0.15 and about 1 quarter wave optical thickness ("QWOT"). Each inner dielectric layer 26 has a thickness between about 0.4 and about 2 QWOT.

The infrared reflective metal layer 16 can be formed from any of the many metals known in the art having infrared reflecting properties. Preferably, the infrared reflecting metal layer 16 comprises silver, gold, copper or alloys thereof. These metals have been found to provide the best overall optical properties in the invention 10. Particularly preferred materials for the infrared reflecting metal layer 16 are alloys of silver and copper. Such alloys have been found to be preferable because of their high resistance to degradation and general transmittance of neutral colors.

A highly preferred embodiment of the invention 10 has an infrared reflecting metal layer 16 comprised essentially of a silver/copper alloy wherein the percentage of copper within the alloy is between about 3 and about 20 weight percent, more preferably between about 5 and about 10 weight percent.

The infrared reflecting metal layer 16 typically has a thickness between about 7 and about 25 nm.

The color correcting metal layer 18 is disposed contiguous to the infrared reflective metal layer 16. The color correcting metal layer 18 is preferably a metal or metallic compound having an index of refraction in the visible wave lengths between about 0.6 and about 4. Also, it is preferable that the color correcting metal layer 18 have a generally increasing index of refraction with increasing wave length for visible light between about 400 nm and about 750 nm. Still further, it is preferable that the color protective metal layer 18 have an extinction coefficient in the visible wave lengths of between about 1.5 and about 7. Finally, it is preferable that the color correcting metal layer 18 increases the corrosion resistance of the infrared reflecting metal layer 16 when the color correcting metal layer 18 is in contact with the infrared reflecting metal layer 16.

The color correcting metal layer 16 has also been found to act as a nucleation layer which significantly increases the adhesion of the protective metal layer 18 to the infrared reflecting metal layer 16.

Metals which have been found useful in the color correcting metal layer 18 are chromium, cobalt, nickel, zinc, palladium, indium, tin, antimony, platinum, bismuth and alloys thereof.

The preferred metal for use in the color correcting metal layer 18 is indium. This metal is preferred because composites 10 using indium tend to transmit light of a neutral, blueish or blue-green hue and because composites 10 using indium have exceptional degradation resistance. Also, composites 10 using indium are preferred because of the relative ease and inexpensive of manufacturing such composites 10, especially where indium oxide is used for the dielectric layers 14, 22 and 26.

The color correcting metal layer 18 is deposited onto the infrared reflecting metal layer 16 in a thickness between about 2 nm and about 15 nm.

The protective metal layer 20 is disposed contiguous with the color correcting metal layer 18. The protective metal layer 20 is comprised of a metal or metallic compound which effectively prevents the oxidation of the color control metal layer 18 during the deposition of the dielectric layers 14, 22 and 26. It is preferable that the protective metal layer 20 have a heat of fusion for its oxide which is less than (more negative than) about −100,000 cal/gm mole at about 25° C.

The protective metal layer 20 should also consist of metals whose oxides are substantially non-optically absorbing.

Metals which have been found to be useful in the protective metal layer 20 are aluminum, titanium, zirconium, niobium, hafnium, tantalum, tungsten and alloys thereof. Titanium has been found to be a most preferred metal for use in the protective metal layer 20 because composites 10 using titanium have been found to be exceptionally degradation-resistant. Titanium is also considerably less expensive than many other suitable protective metals.

The protective metal layer 20 is deposited upon the color corrective metal layer 18 to a thickness between about 1 nm and about 5 nm.

The various layers of the invention discussed to this point are deposited by any of the several deposition techniques known in the art. Typically, such layers are deposited by thermal evaporation or sputtering techniques. Sputtering is generally preferable, but thermal evaporation is often used to deposit the dielectric layers 14, 22 and 26. Thermal evaporation techniques include both electron beam evaporation and resistive heat evaporation techniques. Both such thermal evaporation techniques are well-known in the art.

Sputtering techniques useful in the invention are disclosed in U.S. Pat. No. 5,510,173, the disclosure of which is incorporated herein by this reference. Techniques for depositing layers on glass are further taught in U.S. Pat. No. 4,828,346, the disclosure of which is also incorporated herein by this reference.

In a typical sputtering operation useable in depositing the various layers of the invention 10, apparatus commonly known in the trade as a "vacuum roll coater" is used. Typically, such roll coater has 3–5 sputtering sources arranged around a rotating cooled drum. A length of polyester web used as the substrate 12 is dispensed from an unwind spool, is passed around the surface of the rotating cooled drum and is then guided onto a rewind spool. While disposed around the rotating cooled drum, the 3–5 sputtering sources deposit a layer of material onto the web. During the deposition of the layers, an optical monitor system is disposed proximate to the web at a point near where the web leaves the rotating cooled drum. Such optical monitor system continuously monitors and records both visible transmission spectra through the web and visible reflection spectra away from the web.

During the deposition of oxide layers, the sputtering process is typically a DC magnetron sputtering process conducted in the gas mixture of, for example, 65% argon, 34% oxygen and 1% hydrogen. Sputtering gas pressure is approximately 2 microns of mercury. When the oxide layer is an indium oxide layer, deposition of the indium is accomplished at an oxidation state where approximately maximum conductivity is achieved by the resulting material.

Metal layers are typically sputtered using DC magnetron sputtering in an atmosphere of, for example, 97.5% argon and 2.5% hydrogen. Pressure is maintained at about 1.5 microns of mercury.

As illustrated in FIGS. 2–4, the invention 10 may further comprise one or more transparent top layers 34 consisting essentially of a glass or transparent polymeric plastic material. Use of such top layer 34 provides the composite 10 of the invention with an outer layer which markedly increases the resistance of the invention 10 to corrosion, to other degradation from the atmosphere and to physical damage.

FIGS. 2 and 3 illustrate embodiments specifically adapted for retrofitting onto preexisting transparent structures, such as preexisting architectural or vehicle glass panes. In the embodiments illustrated in FIGS. 3 and 4, the substrate 12 is a thin film material, such as PET. A "hardcoat" layer 36 is deposited onto the surface of the substrate 12 opposite the surface to which the first outer dielectric layer 14 is deposited. The hardcoat layer 36 is typically an acrylic material applied by solvent coating to a thickness of about 1.5 microns. The hard coat layer 36 provides a scratch-resistant layer which protects the thin film substrate 12.

The embodiments illustrated in FIGS. 2 and 3 further comprise a transparent top layer 34 which is typically a second layer of PET having a thickness of about 12 microns, and which typically further includes suitable ultraviolet light absorbers. Such top layer 34 is applied to the second outer dielectric layer 22 by an inner adhesive layer 38 having a thickness of about 1.5 microns. An outer adhesive layer 40 is applied to the opposite side of the transparent top layer 34 to facilitate the attachment of the composite 10 to a preexisting glass pane or other transparent structure. A "peel-away" layer 42 is disposed atop the outer adhesive layer 40 to protect the outer adhesive layer 40 prior to installation.

Preferably, the various layers of the invention 10 are assembled so as to transmit between about 40% and about 60% of light within the visible spectrum. It is also preferable that composites of the invention 10 have reflectances of visible light less than about 15%, typically between about 5% and about 15%. Finally, it is preferable that the layers of the invention 10 be so assembled so that the composite 10 transmits and reflects visible light in "neutral colors" or "slightly blueish or greenish" transmission colors. Transmissions which are "neutral" in color are those which transmit visible light in equal intensities throughout the visible spectrum. Light transmitted with a slightly blueish or slightly greenish tint is light whose components with wave lengths in the 380–500 nm range are slightly higher in intensity than other wave lengths.

In one preferred embodiment of the invention, the composite 10 consists of a first layer of polyethylene terephthalate having a thickness of about 25 microns. Deposited directly upon this layer is a layer of indium oxide having a nominal thickness between about 20 and about 40 nm, preferably about 30 nm. On top of this layer of indium oxide is a layer of silver copper alloy having a thickness between about 9 and about 14 nm, preferably about 9 nm. Deposited directly upon the silver/copper alloy layer is a layer of indium metal having a thickness between about 1 and about 10 nm, preferably about 2 nm. Deposited directly upon this layer of indium metal is a layer of titanium metal having a thickness of between about 0.5 and about 5 nm, preferably about 2 nm. Deposited directly upon the layer of titanium metal are one or two subcomposite stacks. Each subcomposite stack comprising a layer of indium oxide in a thickness between about 50 and about 100 nm, preferably about 76 nm, a layer of silver/copper alloy having a thickness between about 9 and about 14 nm, preferably about 11 nm, a layer of indium metal having a thickness between about 1 and about 10 nm, preferably about 3 mm, and a layer of titanium metal having a thickness between about 0.5 and about 5 nm, preferably about 2 nm. Deposited on top of the one or two subcomposite stacks is a top layer of indium oxide in a thickness between about 20 and about 40 nm, preferably about 30 nm. Laminated on top of this layer of indium oxide is a top layer of polyethylene terephthalate having a nominal thickness of about 0.92 mils. The index of refraction of the indium oxide layers in this preferred embodiment is between about 2.0 and about 2.2. The silver/copper alloy has approximately 7 weight percent copper.

The invention provides an exceptional fenestration product having a myriad of useful applications. Many such applications are discussed in U.S. Pat. Nos. 4,368,945 and 4,463,047, both of which are incorporated herein by this reference.

In another use of the invention, the fenestration product of the invention comprises one panel of a dual pane insulating glass unit. One of the two panes of the glass unit is used as the substrate for the invention. The various layers deposited upon the substrate are disposed between the two panes of the glass unit within the gas cavity between the panes.

The invention has been found to provide a highly degradation-resistant infrared reflecting fenestration product which effectively reduces the transmission of energy within the infrared and near infrared wave lengths. For light having a wave length greater than about 1,500 nm, less than about 7% of the infrared energy is transmitted. The invention has also been found to provide a composite which allows the transmission of 40%–60% of light within the visible wave lengths. Moreover, the composites of the invention can easily be constructed having reflectances less than 15% and having both transmission and reflectances in the neutral color or (if preferred) soft blue or soft green colors. The invention satisfies a long-felt need for such an infrared reflecting fenestration product.

Having thus described the invention, it should be apparent that numerous structural modifications and adaptations may be resorted to without departing from the scope and fair meaning of the instant invention.

What is claimed is:

1. A heat reflecting fenestration composite comprising in sequence:
   (a) a substantially transparent first substrate;
   (b) a first outer dielectric layer;
   (c) an infrared reflecting metal layer;
   (d) a color correcting metal layer comprising a metal different from the infrared reflecting metal layer;
   (e) a protective metal layer comprising a metal different from the infrared reflecting metal layer and different from the color correcting layer;
   (f) a subcomposite comprising:
      (i) a subcomposite inner dielectric layer;
      (ii) a subcomposite infrared reflecting metal layer;
      (iii) a subcomposite color correcting metal layer comprising a metal different from the subcomposite infrared reflecting metal layer; and
      (iv) a subcomposite protective metal layer comprising a metal different from the subcomposite infrared reflecting metal layer and different from the subcomposite color correcting layer;
   (g) a second outer dielectric layer; and
   (h) a substantially transparent second substrate;
   wherein the heat reflective substrate transmits 40–60% of light within the visible wavelengths and has a reflectance of less than 15%; and
   wherein the color of both transmitted and reflected light from the heat reflecting fenestration product is either neutral or is slightly blueish or slightly greenish in color.

2. The heat reflecting fenestration composite of claim 1 wherein the outer dielectric layers have an index of refraction between about 1.9 and about 2.5.

3. The heat reflecting fenestration composite of claim 1 wherein the outer dielectric layers have a thickness between about 0.15 quarter wave optical thickness and about 1 quarter wave optical thickness.

4. The heat reflecting fenestration composite of claim 1 wherein the outer dielectric materials are selected from the group of dielectric materials consisting of (i) oxides of magnesium, indium, tin, indium and tin, tantalum, yttrium, niobium, tungsten, zinc, bismuth, titanium and mixtures thereof and (ii) nitrides of silicon and aluminum.

5. The heat reflecting fenestration composite of claim 1 wherein the subcomposite inner dielectric layer has an index of refraction between about 1.4 and about 2.5, is chosen from the group of dielectric materials consisting of (i) oxides of magnesium, indium, tin, indium and tin, tantalum, yttrium, niobium, tungsten, zinc, bismuth, titanium and mixtures thereof, (ii) nitrides of silicon and aluminum, and (iii) polymeric materials, and has a thickness between about 0.3 quarter wave optical thickness and about 2 quarter wave optical thickness.

6. The heat reflecting fenestration composite of claim 1 wherein the dielectric layers are chosen from the group of dielectric materials consisting of indium oxide, indium zinc oxide, indium tin oxide and mixtures thereof.

7. The heat reflecting fenestration composite of claim 1 wherein the infrared reflecting metal layer has a thickness between about 7 nm and about 25 nm.

8. The heat reflecting fenestration composite of claim 1 wherein the infrared reflecting metal layers are chosen from the list of metals consisting of silver, gold, copper and alloys thereof.

9. The heat reflecting fenestration composite of claim 1 wherein the infrared reflecting metal layers comprise silver.

10. The heat reflecting fenestration composite of claim 1 wherein the infrared reflecting metal layers consist essentially of a silver/copper alloy wherein the percentage of copper within the alloy is between 3 and about 20 weight percent.

11. The heat reflecting fenestration composite of claim 1 wherein the infrared reflecting metal layers consist essentially of a silver/copper alloy wherein the percentage of copper within the alloy is between about 5 and about 10 weight percent.

12. The heat reflecting fenestration composite of claim 1 wherein the color correcting metal layers have a refractive index in the visible light wave range between about 0.6 and about 4.

13. The heat reflecting fenestration composite of claim 1 wherein the index of refraction for the color correcting metal layers generally increase with increasing wave lengths for light waves having a wave length between about 400 nm and about 750 mm.

14. The heat reflecting fenestration composite of claim 1 wherein the color correcting metal layers have an extinction coefficient for light in the visible range of between about 1.5 and about 7.

15. The heat reflecting fenestration composite of claim 1 wherein the color correcting metal layers have a thickness between about 2 nm and about 15 nm.

16. The heat reflecting fenestration composite of claim 1 wherein the color correcting metal layers are chosen from the group of metals consisting of chromium, cobalt, nickel, zinc, palladium, indium, tin, antimony, platinum, bismuth and alloys thereof.

17. The heat reflecting fenestration composite of claim 1 wherein the color correcting metal layers consist essentially of indium.

18. The heat reflecting fenestration composite of claim 1 wherein the protective metal layers consist substantially of a metal whose oxide is substantially non-optically absorbing.

19. The heat reflecting fenestration composite of claim 1 wherein the protective metal layers have a thickness between about 1 nm and about 5 nm.

20. The heat reflecting fenestration composite of claim 1 wherein the protective metal layers are chosen from the list of metals consisting of aluminum, titanium, zirconium, niobium, hafnium, tantalum, tungsten and alloys thereof.

21. The heat reflecting fenestration composite of claim 1 wherein the protective metal layers consist essentially of titanium.

22. The heat reflecting fenestration composite of claim 1 wherein each infrared reflecting metal layer is sandwiched between a pair of color correcting metal layers comprising metals different from the respective infrared reflecting metal layer and wherein each color correcting metal layer is contiguous with a protective metal layer comprising a metal different from the infrared reflecting and metal layers and different from the color correcting metal layers.

23. The heat reflecting fenestration composite of claim 1 wherein the number of subcomposites is two.

24. The heat reflecting fenestration composite of claim 1 wherein the substantially transparent second substrate is disposed contiguous with the second outer dielectric layer.

25. The heat reflecting fenestration composite of claim 1 wherein the composite transmits less than about 7% of the infrared energy in light having a wavelength greater than about 1500 nm.

26. The heat reflecting fenestration composite of claim 1 wherein the combined thicknesses of the infrared reflecting metal layer and the color correcting metal layer is to more than 24 nm.

27. The heat reflecting fenestration composite of claim 1 wherein the combined thicknesses of the infrared reflecting metal layer and the color correcting metal layer is 10–24 nm.

28. The heat reflecting fenestration composite of claim 1 wherein the combined thicknesses of the infrared reflecting metal layer, the color correcting metal layer and the protecting metal layer is no more than 29 nm.

29. The heat reflecting fenestration composite of claim 1 wherein the combined thicknesses of the infrared reflecting metal layer, the color correcting metal layer and the protecting metal layer is 10.5–29 nm.

30. The heat reflecting fenestration composite of claim 1 wherein the combined thicknesses $T_1$ of the infrared reflecting metal layer, the color correcting metal layer and the protecting metal layer is different than the combined thickness $T_2$ of the subcomposite infrared reflecting metal layer, the subcomposite color correcting metal layer and the subcomposite protecting metal layer, and wherein $T_1$ and $T_2$ are in a ratio to one another of about 1.2.

31. A heat reflecting fenestration composite comprising in sequence:
  (a) a substantially transparent first substrate;
  (b) a first outer dielectric layer;
  (c) an infrared reflecting metal layer comprising silver;
  (d) a color correcting metal layer comprising a metal chosen from the group of metals consisting of chromium, cobalt, nickel, zinc, palladium, indium, tin, antimony, platinum, bismuth and alloys thereof;
  (e) a protective metal layer comprising a metal chosen from the group of metals consisting of aluminum, titanium, zirconium, niobium, hafnium, tantalum, tungsten and alloys thereof;
  (f) a subcomposite comprising:
    (i) a subcomposite inner dielectric layer;
    (ii) a subcomposite infrared reflecting metal layer comprising silver;
    (iii) a subcomposite color correcting metal layer comprising a metal chosen from the group of metals consisting of chromium, cobalt, nickel, zinc, palladium, indium, tin, antimony, platinum, bismuth and alloys thereof;
    (iv) a subcomposite protective metal layer comprising a metal chosen from the group of metals consisting of aluminum, titanium, zirconium, niobium, hafnium, tantalum, tungsten and alloys thereof;

(g) a second outer dielectric layer; and (h) a substantially transparent second substrate disposed contiguous with the second outer dielectric layer;

wherein the dielectric layers are chosen from the group of dielectric materials consisting of indium oxide, indium zinc oxide, indium tin oxide and mixtures thereof;

wherein the heat reflective substrate transmits 40–60% of light within the visible wavelengths and has a reflectance of less than 15%;

wherein the color of both transmitted and reflected light from the heat reflect substrate is either neutral or is blue or green in color; and wherein the composite transmits less than about 7% of the infrared energy in light having a wavelength greater than about 1500 nm.

32. A heat reflecting fenestration composite comprising in sequence:

(a) a substantially transparent substrate;

(b) a first outer dielectric layer;

(c) an infrared reflecting metal layer;

(d) a color correcting metal layer comprising a metal different from the infrared reflecting metal layer;

(e) a protective metal layer comprising a metal different from the infrared reflecting metal layer and different from the color correcting layer;

(f) a subcomposite comprising:
  (i) a subcomposite inner dielectric layer;
  (ii) a subcomposite infrared reflecting metal layer;
  (iii) a subcomposite color correcting metal layer comprising a metal different from the subcomposite infrared reflecting metal layer; and
  (iv) a subcomposite protective metal layer comprising a metal different from the subcomposite infrared reflecting metal layer and different from the subcomposite color correcting layer; and (g) a second outer dielectric layer;

wherein the combined thickness $T_1$ of the infrared reflecting metal layer, the color correcting metal layer and the protecting metal layer is different than the combined thickness $T_2$ of the subcomposite infrared reflecting metal layer, the subcomposite color correcting metal layer and the subcomposite protecting metal layer, and wherein $T_1$ and $T_2$ are in a ratio to one another of about 1.2.

\* \* \* \* \*